United States Patent [19]

Rumreich

[11] Patent Number: 5,251,015
[45] Date of Patent: Oct. 5, 1993

[54] APPARATUS FOR POSITIONING A TIMING SIGNAL RELATIVE TO A SYNCHRONIZATION SIGNAL DERIVED IN THE DEFLECTION SECTION OF A TELEVISION SYSTEM

[75] Inventor: Mark F. Rumreich, Indianapolis, Ind.

[73] Assignee: Thomson Consumer Electronics, Inc., Indianapolis, Ind.

[21] Appl. No.: 696,488

[22] Filed: May 6, 1991

[51] Int. Cl.$^5$ .............................................. H04N 9/44
[52] U.S. Cl. ...................................... 358/20; 358/17; 358/19; 358/22
[58] Field of Search ...................... 358/17, 19, 20, 148, 358/158, 159, 183, 22

[56] References Cited

U.S. PATENT DOCUMENTS 3,544,708 12/1970 Buechel .................................. 358/20
4,665,438 5/1987 Miron et al. ......................... 358/183

FOREIGN PATENT DOCUMENTS 0406698 1/1991 European Pat. Off. .
0449130 10/1991 European Pat. Off. .
56-100574 8/1981 Japan .

OTHER PUBLICATIONS

The CTC 168/169 Technical Training Manual published by Thomson Consumer Electronics, Inc. in 1990, pp. 66–88.

Primary Examiner—James J. Groody
Assistant Examiner—David E. Harvey
Attorney, Agent, or Firm—Joseph S. Tripoli; Peter M. Emanuel

[57] ABSTRACT

In a picture in picture (PIP) section of a color television receiver, color burst pulses for extracting the color burst of a video signal corresponding to the main picture are generated in response to horizontal synchronization pulses derived by the deflection section of the television receiver. The color burst is used to derive a color subcarrier signal for remodulating baseband color components corresponding to the small picture insert. The deflection related horizontal synchronization pulses are coupled to the PIP section in order to properly position the small picture in relation to the main picture despite horizontal centering adjustments. In order to properly position the color burst pulses, a burst gate pulse delay control signal is generated in response to the relationship between the positions of the deflection related horizontal synchronization pulses and the horizontal synchronization pulses of the video signal corresponding to the main picture. The color burst pulse delay signal is advantageously generated by a microprocessor-based television control unit which receives both deflection and video related horizontal synchronization pulses for on-screen and tuning control purposes, respectively.

16 Claims, 8 Drawing Sheets

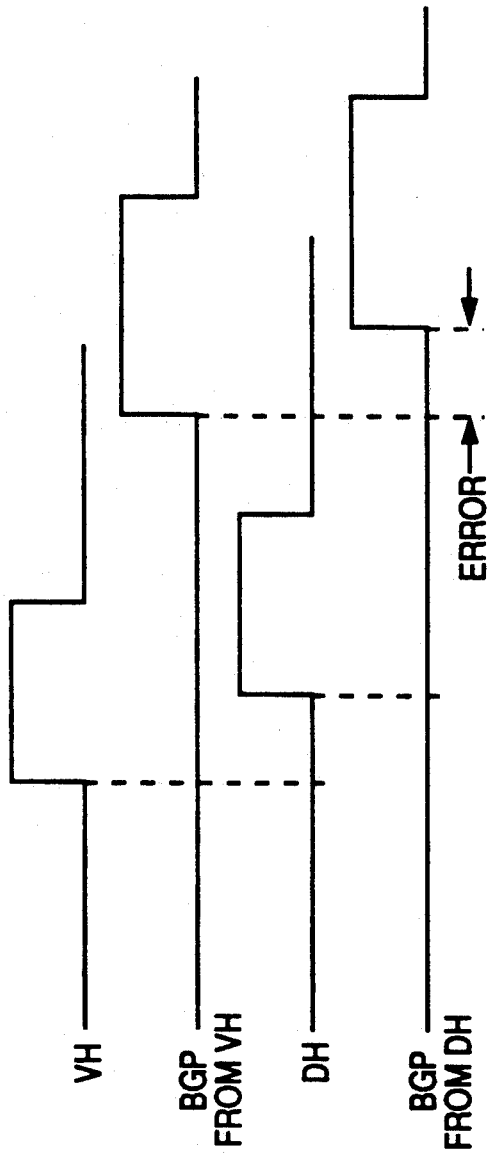

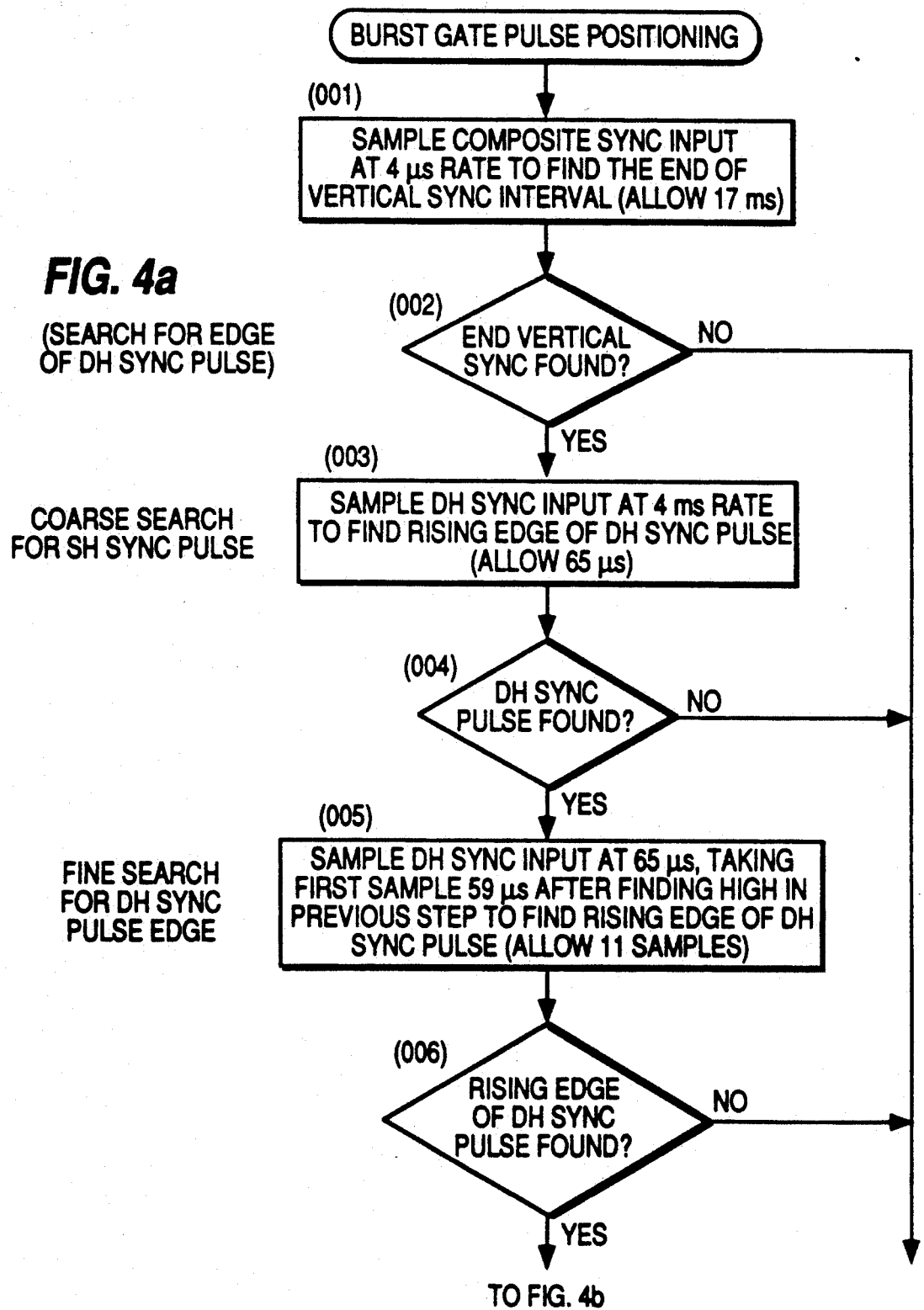

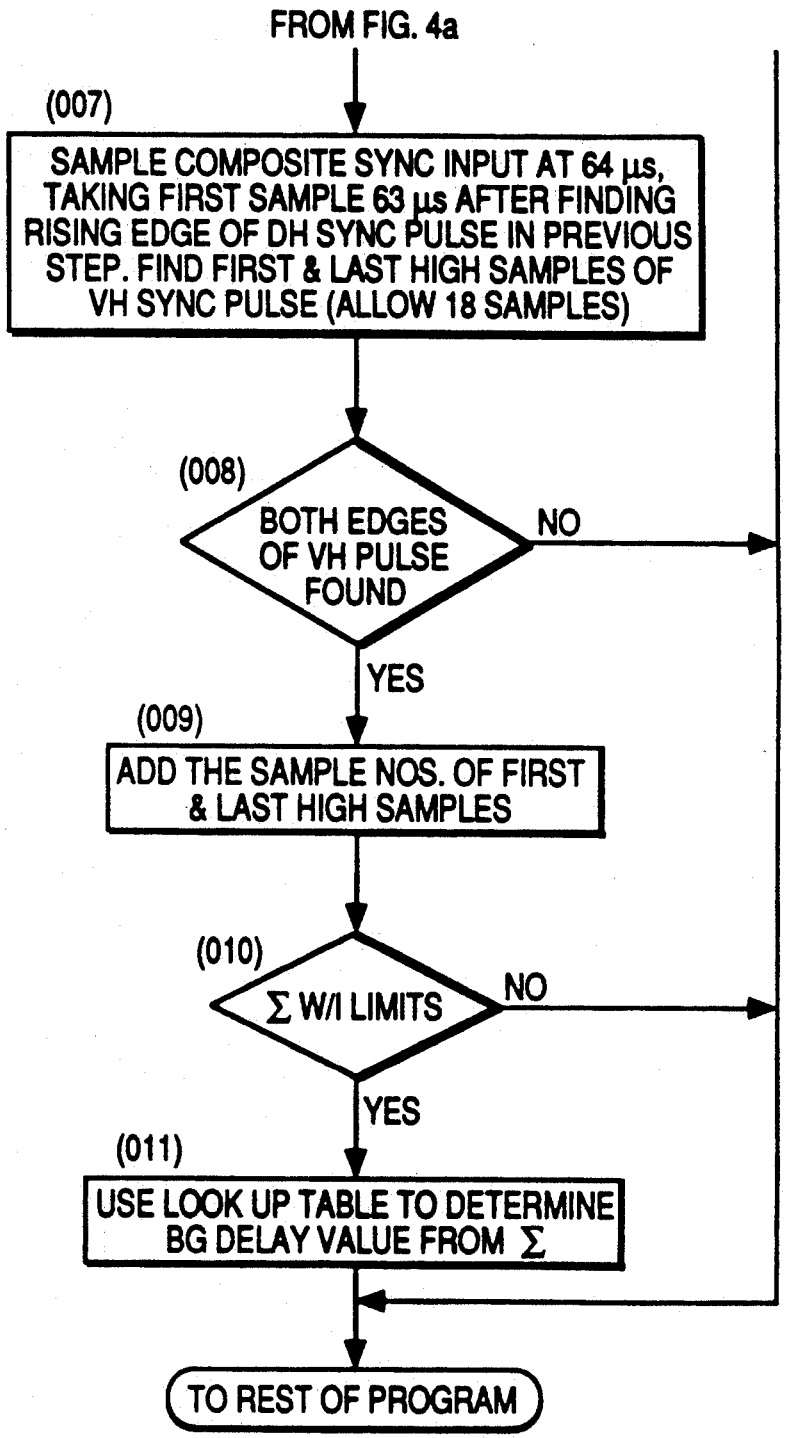

APPARATUS FOR POSITIONING A TIMING SIGNAL RELATIVE TO A SYNCHRONIZATION SIGNAL DERIVED IN THE DEFLECTION SECTION OF A TELEVISION SYSTEM

FIELD OF THE INVENTION

The invention concerns a television system including apparatus for positioning a timing signal relative to a synchronization signal derived in the deflection section.

BACKGROUND OF THE INVENTION

Many television receivers include provisions for displaying a secondary image or picture within a main picture. For example, characters and/or graphics may be displayed on the screen of a display device together with a main picture derived from a video signal provided by a tuner. Such "on-screen display" (OSD) provisions are useful for providing status information, such as the channel number of the presently selected channel, the present time and the volume level, and operating instructions for various functions of the receiver. Some television receivers include provision for inserting a small picture (or "insert") within a main (or "big") picture. In such a "picture-in-picture" (PIP) arrangement, the main picture may be derived from a video signal provided by a tuner and the small picture may be derived from an auxiliary video source, such as a second tuner, VCR or video disk player.

The secondary image or picture provided by an OSD or PIP arrangement is synchronized by synchronization signals derived by the deflection section of the television receiver so that it is properly positioned relative to the main picture. However, other timing signals which are necessary for the generation of secondary image or picture and which are derived from the synchronization signals may be improperly shifted in time because of centering adjustment, depending on how the centering adjustment is achieved.

For example, in a PIP arrangement, it is usually necessary to demodulate a composite color video signal corresponding to the small picture and to remodulate it utilizing a color subcarrier signal which is locked in frequency and in phase with the color subcarrier of the color video signal corresponding to the main or big picture so that the two video signals can be combined and processed together in a common signal processing section. Remodulating the video signal corresponding to the small picture involves extracting the color burst component of the video signal corresponding to the main picture and using it to control the frequency and phase of a color oscillator in the PIP processing section. Extracting the color burst requires the generation of a burst gating pulse timed so that it may be utilized to separate ("gate-out") the color burst component from the video signal corresponding to the main picture. If the gating pulse is derived from a sychronization signal derived by the deflection section, its position in time may not be proper relative to the occurrence of color burst component, especially if a certain type of centering adjustment has been made.

SUMMARY OF THE INVENTION

An aspect of the invention resides in the recognition of the above-described and similar problems related to a timing signal derived in response to deflection related synchronization signals. Another aspect of the invention concerns apparatus for overcoming such problems by determining what the time relationship is between a synchronization signal derived by the deflection section and a synchronization signal derived by a synchronization signal separator directly from a video signal and generating a control signal for adjusting the time position of the timing signal accordingly. This may be accomplished by measuring the time relationship between the deflection related synchronization signal and the video related synchronization signal. It may also be accomplished directly in response to a centering control signal.

BRIEF DESCRIPTION OF THE DRAWING

These and other aspects of the invention will be described with reference to the the accompanying Drawing in which:

FIG. 3 is a graphical representation of waveforms helpful in understanding a problem solved by the invention;

FIGS. 4a–4b is a flow chart of a portion of a software control program concerned with an aspect of the invention;

In various Figures corresponding elements are identified by the same reference designations.

DETAILED DESCRIPTION OF THE DRAWING

Figure 1:
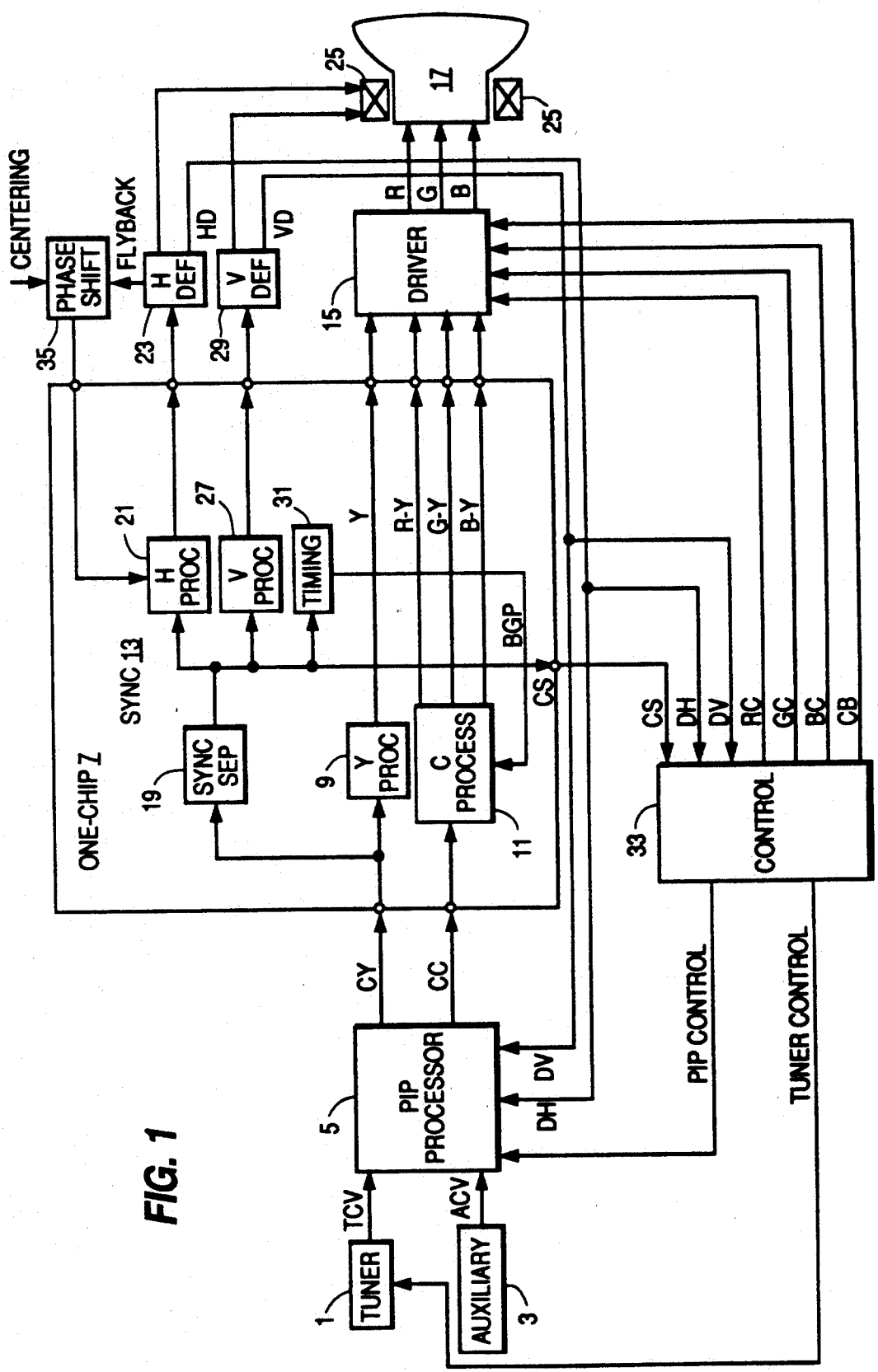
FIG. 1 is a block diagram of a television receiver constructed in accordance with an aspect of the invention.

The television receiver shown in FIG. 1 is generally similar to RCA brand name color television receivers utilizing CTC-169 electronic chassis which are described "RCA/GE Color Basic Service Data-CTC169(DV)" published by Thomson Consumer Electronics, Inc., Indianapolis, Ind. in 1990. The television receiver includes a tuner section 1 for deriving a tuner derived composite video (TCV) signal including luminance, composite synchronization and modulated chrominance components from a received RF television signal. Although not specifically shown for simplicity, tuner 1 comprises a tuner, an IF section and a video detector. An auxiliary video source section 3 provides an auxiliary composite video (ACV) signal. Auxiliary video section 3 may comprise a second tuner section or a composite video signal input to which a VCR or video disk player may be connected. The TCV and ACV composite video signals are coupled to a PIP processing section 5 which produces a combined baseband luminance (CY) signal and a combined modulated chrominance (CC) signal at respective outputs. In a PIP mode of operation, the combined signals represent a main or big picture and a second or small picture inserted within the the main picture. The tuner derived and auxiliary composite video (TCV and ACV) signals may be selectively exchanged as the signals from which the main and small pictures are derived. In a normal or non-PIP mode of operation, the small picture is eliminated and only a main picture is displayed.

The combined luminance and chrominance (CY and CC) signals are coupled to a signal processing unit 7 incorporated with an IC sometimes referred to in the television industry as a "one-chip" television IC. The TA8680 one-chip television IC available from Toshiba Corp., which is utilized in the RCA CTC-169 chassis referred to above, is suitable for use in the television receiver shown in FIG. 1. Signal processing unit 7 includes a luminance (Y) section 9, a chrominance (C) section 11 and a synchronization section 13. Luminance section 9 processes the luminance signal and controls the contrast, sharpness and brightness properties of the picture. Chrominance sections 11 demodulates the modulated chrominance signal to produce red, green and blue color difference (R-Y, G-Y and B-Y) signals and controls the saturation and tint properties of the picture. Although not shown, chrominance section 11 includes a color oscillator and a phase locked loop which locks the frequency and phase of the output signal color oscillator to that of the color burst component of the chrominance signal. The color burst component is extracted in response to a burst gate pulse generated in the manner described below. The processed luminance signal (Y) and the color difference (R-Y, G-Y and B-Y) signals are coupled to an output amplifier and matrix or "driver" 15 which supplies high level red (R), green (G) and blue (B) signals to a picture tube 17.

Synchronization section 13 includes a synchronization ("sync") separator 19 for extracting the composite sync signal containing horizontal and vertical sync components from the luminance signal. A horizontal sync section 21 derives vertical sync pulses from the composite sync signal. The horizontal sync pulses are coupled to a horizontal deflection section 23 which supplies horizontal deflection signals to deflection coils 25 associated with picture tube 17. A vertical sync section 27 derives vertical sync pulses from the composite sync signal. The vertical sync pulses are coupled to a vertical deflection section 29 which supplies vertical deflection signals to deflection coils 25. Synchronization section 13 includes a timing generator 31 which, among other timing signals, generates the burst gate pulse, which is utilized for color demodulation as described above, in response to the composite sync signal.

Various sections of the television receiver are controlled by a microprocessor-base control unit 33 such as the so-called "TELEKAT" television control IC, including a 6805 based microprocessor, available from Motorola Semiconductor Products, Inc. Control unit 33 controls the channel selected by tuner section 1, the selection of the main and small pictures by PIP section and various functions of one-chip 1 such as picture contrast, sharpness, brightness, color saturation and tint. Although separate control lines are shown in FIG. 1 for sake of explanation, it will be appreciated that a common control bus may be utilized in an actual television receiver. Control unit 33 receives the composite sync (CS) signal generated by sync separator 19 in connection with a tuning control algorithm which determines when a channel has been properly tuned. This algorithm is described in detail in U.S. patent application Ser. No. 513,445, entitled "Sync Validity Detector Utilizing A Microcomputer", filed for J. Tults on Apr. 30, 1990, and assigned to the same assignee as that of the present application. Control unit 33 also generates red, green and blue character (RC, GC and BC) signals and a character blanking signal (CB) for displaying characters and/or graphics on the screen of picture tube 17. The character blanking signal is utilized for blanking the video image behind the characters and graphics so as to make them more visible.

Horizontal (DH) and vertical (DV) sync pulses derived by respective deflection sections 23 and 29 are coupled to PIP section 5 to position the small picture with respect to the main picture. The HD and VD sync pulses are also coupled to control unit 33 to position the OSD characters and graphics with respect to the main picture. The manner in which the horizontal sync pulses are derived gives rise to a problem which is solved in accordance with an aspect of the invention. This problem will now be described.

Although not shown in detail, horizontal sync section 21 includes an oscillator and a automatic frequency and phase control (AFPC) loop which locks the frequency of the oscillator to the frequency of the horizontal sync pulses of the composite sync signal produced by sync separator from the luminance signal. The control loop is also responsive to horizontal flyback pulses produced by horizontal deflection section 23 to ensure that the horizontal deflection signal is properly phased with respect to the color signals coupled to picture tube 17. Provisions are made to allow for a horizontal position adjustment, referred to as a "centering" adjustment, to correct for tolerance variations of picture tube 17 and deflection coils 25. In the television receiver shown in FIG. 1, the centering provisions include an adjustable phase shift network 35 coupled between horizontal deflection section 23 and the AFPC loop within horizontal sync section 21 to phase shift the horizontal flyback pulse by an amount necessary for centering. For this purpose, phase shift network 35 may comprise an adjustable R-C network. Unfortunately, the position of the deflection derived horizontal sync (DH) pulses is shifted with respect to the horizontal sync pulses of the video signals processed by PIP section 5 as a function of the centering adjustment. This can result in timing errors within PIP section 5 as will be described below. This problem can be avoided if a so called "DC centering" arrangement is used. A DC centering arrangement operates by supplying a DC bias to the deflection coils to affect centering correction and does not result in a position shift of deflection derived horizontal sync pulses. However, a DC type of centering arrangement is significantly more expensive compared with the phase shift type since it requires an expensive inductor. The invention to be described permits the use of the phase shift type of centering arrangement while solving the PIP timing problem.

Figure 2:
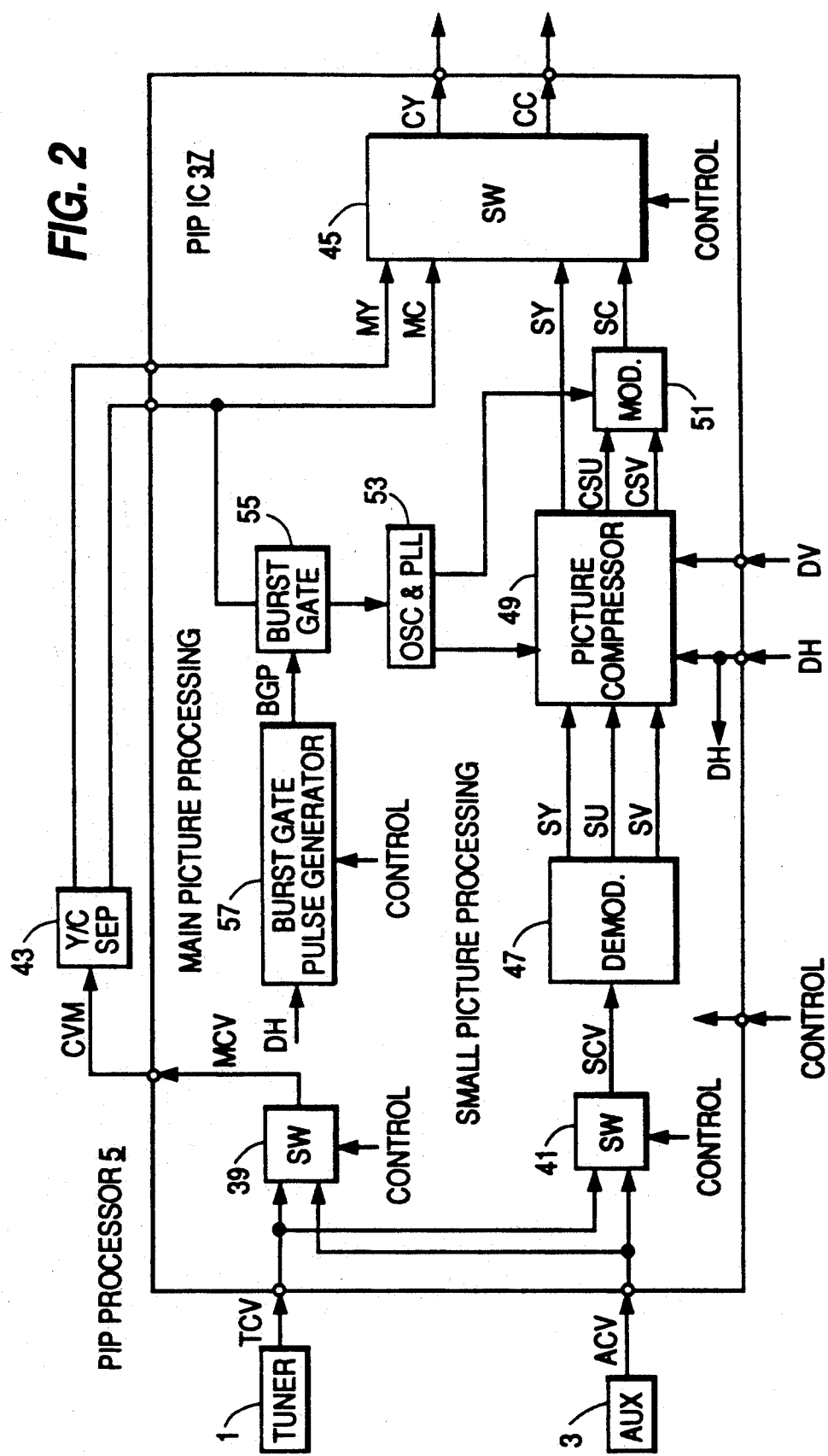
FIG. 2 is a block diagram of the PIP section of the television receiver shown in FIG. 1.

The PIP timing problem will now be described with reference to FIG. 2. As shown in FIG. 2, a significant portion of PIP processing section 7 may be incorporated in a single IC 37. PIP IC 7 is generally similar to the PIP IC utilized in the RCA CTC-169 chassis. However, PIP IC 37 is significantly different with respect to the horizontal synchronization signal available for the required remodulation process to be described below.

PIP IC 37 includes input switching sections 39 and 41 which selects one of the two composite video input signals (TCV and ACV) which is to be used to produce the main picture and which one is to be used to produce the small picture. The composite video (MCV) signal which is selected for the main picture has its luminance and chrominance components separated by an external luminance/chrominance (Y/C) separator and the resultant components (MY and MC) are coupled to an output switching section 45. Switching section 45 serves to combine the luminance and chrominance components for the main (MY and MC) and small (SY and SC) pictures to produce the combined luminance and chrominance components (CY and CC) which are coupled to the signal processing section one-chip 7 shown in FIG. 1. Switching sections 39, 41 and 45, as well as other portions of PIP IC 37, are controlled in response to the control signal generated by control unit 33 shown in FIG. 1.

The composite video (SCV) signal selected for the small picture is demodulated by a demodulator 47 to produce a baseband luminance (SY) signal and two baseband color difference (SU and SV) signals. For example, the baseband color difference signals may be I and Q or R-Y and B-Y color difference signals, but are indicated symbolically by the letters U and V. Demodulator 47 includes a luminance/chrominance separator and a color demodulator similar to the one utilized in chrominance section 11 of one-chip 7 shown in FIG. 1.

A digital compressor 49 compresses the baseband components in the vertical dimension by the deleting lines and in the horizontal dimension by deleting pixels to form the luminance component (SY) for the small picture and two compressed baseband color difference (CSU and CSV) signals. Digital compressor 49 includes a memory in which the compressed baseband signal are stored and from which they are "read" in synchronism with the deflection derived sync pulses (DH and DV) in order to position the small picture relative to the main picture, as earlier noted.

A color modulator 51 modulates the compressed baseband color difference (CSU and CSV) signals on to a color subcarrier to form the modulated chrominance (SC) signal for the small picture. The luminance (SY) and chrominance components for the small picture are coupled to switching section 45.

The color difference (CSU and CSV) signals for the small picture must be modulated on a color subcarrier which has the same frequency and phase as the color subcarrier of the chrominance (MC) component for the main picture. One possibility for this purpose is to utilize the output signal of the color oscillator of chrominance section 11 of one-chip 7. However, this is undesirable since it would mean adding terminal for this purpose to one-chip 7, and terminals are usually a scarce commodity for one-chip television ICS because of the numerous functions they perform. In addition coupling the output signal of the color oscillator to remote locations tends to introduce unwanted phase shifts which interfere with proper color demodulation and may also cause unwanted radiation at the relatively high color subcarrier frequency. Therefore it is desirable to generate the color subcarrier for the remodulation process as well as related clock signals for various other PIP processes completely within PIP IC 37. For that reason a phase locked loop (PLL) 53 including a color oscillator, a burst gate 55 and a burst gate pulse generator 57 are included within PIP IC 37. The purpose of burst gate is 55 is to extract the color burst of the chrominance (MC) component for the main picture in response to a burst gate pulse (BGP) generated by burst gate generator 57. The color burst is utilized by PLL 53 to lock the frequency and phase of the color oscillator to that of the color subcarrier of the chrominance (MC) component for the main picture.

A horizontal sync pulse having the same position as the horizontal sync pulse of the composite luminance (MY) component for the main picture would ordinarily be required in order to generate a properly positioned burst gate pulse since the color burst occurs a predetermined time after the leading edge of the latter horizontal sync pulse. However such a properly positioned horizontal sync pulse is not readily available because the number of terminals of PIP IC 37 is limited (in comparison to the PIP IC utilized in the RCA CTC-169 chassis), allowing only the deflection derived horizontal sync pulse (DH), required for horizontally positioning the small picture with respect to the main picture, to be coupled to PIP IC 37. While a properly positioned horizontal sync pulse could be derived from the composite luminance (MY) component for the main picture, this would require a sync separator, a horizontal oscillator and associated phase locked loop and other circuitry to be included within PIP IC 37 and is therefore an undesirable solution. The burst gate pulse will not be positioned properly if the deflection derived horizontal sync pulse (DH) instead of a horizontal sync pulse (VH) derived from the composite luminance (MY) component for the main picture is utilized because the deflection derived horizontal sync pulse (DH) has been shifted in accordance with the centering adjustment. The resulting error is demonstrated with respect to the waveforms shown in FIG. 3. It is noted that the error is not predictable in advance because the centering adjustment is made during final assembly after the picture tube is mated with the electrical chassis. In addition, the centering adjustment may become necessary in the field after the television receiver is sold.

An aspect of the invention concerns utilizing microprocessor-based control unit 33 shown in FIG. 1 to measure the time between the deflection derived horizontal sync pulses (DH) and the horizontal sync pulses of the composite sync signal derived by sync separator 19 of one-chip 7 and thereafter to calculate a delay value which is utilized for properly positioning the burst gate pulse utilized in PIP IC 3. Advantageously, both the deflection derived horizontal sync pulses (DH) and the composite sync signal are coupled to control unit 33. The deflection derived horizontal sync pulses (DH) are coupled to control unit 33 to position OSD characters and graphics. The composite sync signal is coupled to control unit 33 in connection with the tuning control algorithm in order to determine when a channel has been properly tuned.

Figure 5:
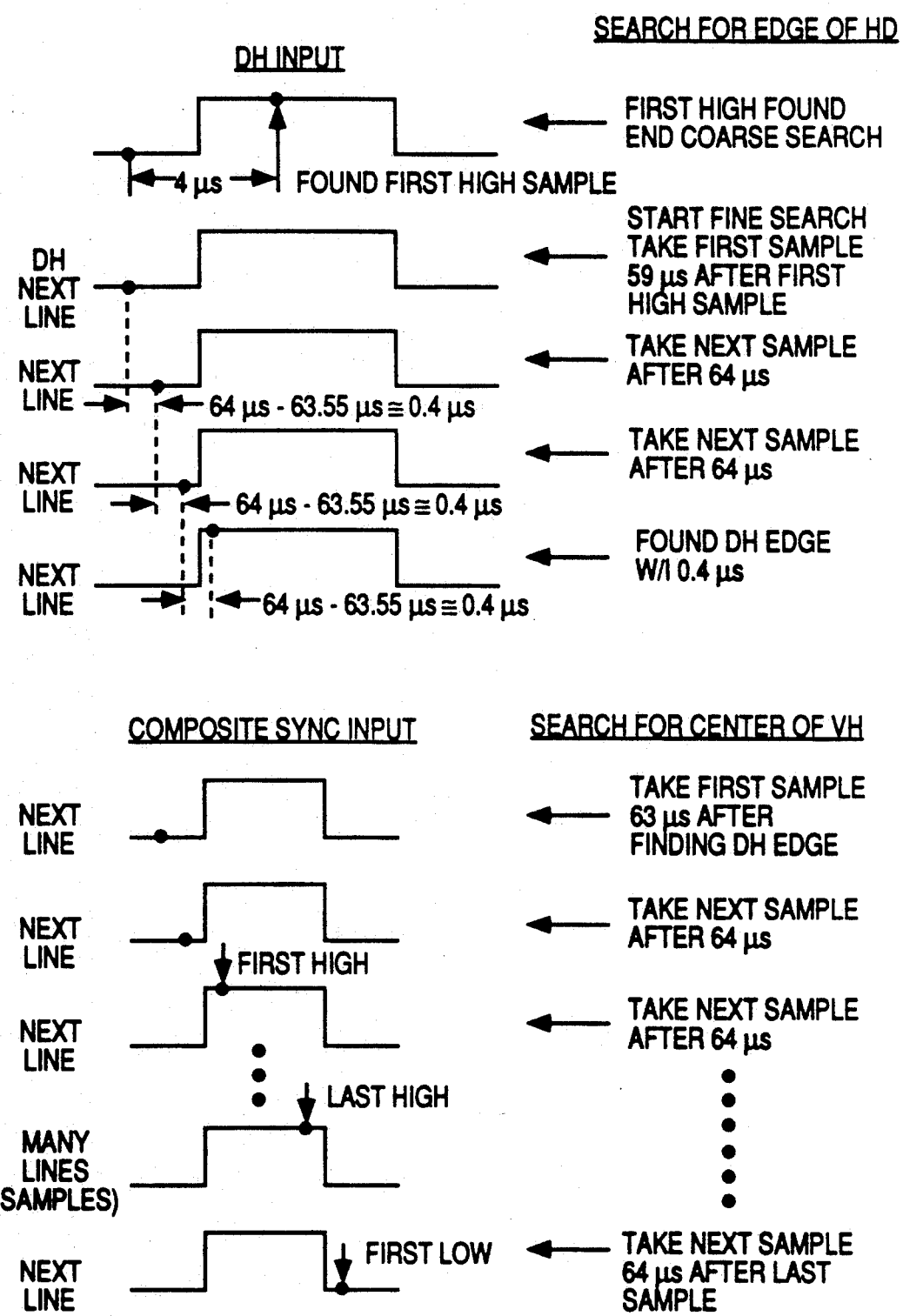
FIG. 5 is a graphical representation of waveforms helpful in understanding the flow chart shown in FIG. 4.

The flow chart for this portion of the software control program of control unit 33 concerned with measuring the time between the deflection derived horizontal sync pulses (DH) and the horizontal sync pulses of the composite sync signal derived by sync separator 19 and thereafter calculating the delay value which is utilized for properly positioning the burst gate pulse is shown in FIG. 4. Reference to the waveforms shown in FIG. 5 will facilitate an understanding various operations in the program, in the following description, the numbers in parenthesis identify steps in the flow chart.

The program for positioning the burst gate is entered at some convenient point within the main control program. For example, it may be entered each time a new channel is selected by a user. This will cause the position of the burst gate to be updated very frequently and therefore ensure continued accuracy. The program may also be initiated when a search for active channels is activated by a user. Such a search is utilized to automatically find and store active channels in a tuning memory and is sometimes referred to as "autoprogramming". "Autoprogramming" searches are usually initiated when the televison receiver is moved to a new location or after a power failure during which power has been removed from the television receiver and therefore the tuning memory. Therefore, the burst gate position will be updated infrequently.

The purpose of the program is to determine the position of the leading edge of the deflection derived horizontal (DH) sync pulse relative to the center of the video related (VH) sync pulse by sampling each of the respective inputs of control unit 33. The center of the VH sync pulse is utilized because the edges of pulses contain in the composite sync signal have finite rise and fall times and are affected by noise. By comparison the, leading edge of the DH sync pulse is relatively sharp and can be reliably utilized. The sample rate is determined by the instruction cycle time of microprocessor-base control unit 3. The sampling rate is About 4 microseconds utilizing a Motorola TELEKAT IC.

The DH sync input is sampled first. Samples are taken to determine if that the vertical sync interval has passed (001-002). With positive result, a coarse search for the high level of the DH sync pulse is conducted (003-004). Having found the high level, a fine search is conducted (005-006). The fine search makes use of the fact that the time interval between horizontal sync pulses is consistently 63.55 microseconds so that the horizontal sync pulses of succeeding line intervals are effectively aligned (see FIG. 5). If samples are taken at 64 microsecond intervals, a sampling accuracy of about 0.4 microseconds (64−63.55=0.45) results. The first sample of the fine search is taken 59 microseconds after the high level is located during the coarse search. This ensures that the fine search starts somewhat before the leading edge of the DH sync pulse.

After the leading edge of the DH sync pulse has been located, the VH input is sampled at 64 microseconds in order to locate the positions of the first and last high samples of the VH sync pulse (007-008). Each sample is given a respective sample number. The average of the positions (which are indicated by the respective sample numbers) of the first and last high samples is a measure of the position of the center of the VH sync pulse from the leading edge of the DH sync pulse. The average calculation is not necessary since the burst gate delay can be obtained from a look-up table directly from the sum of the sample numbers (009-011). If the sum is not within limits (010) it is ignored and the burst gate position is not adjusted. In addition, only one step of burst gate position change from the last value is allowed, independent of the sum. These two features of the program provide noise immunity.

After the burst gate position has been adjusted the next portion of the main control program is entered. If any test within the program fails, the burst gate position is also not adjusted and the next portion of the main control program is automatically entered.

Figure 6:
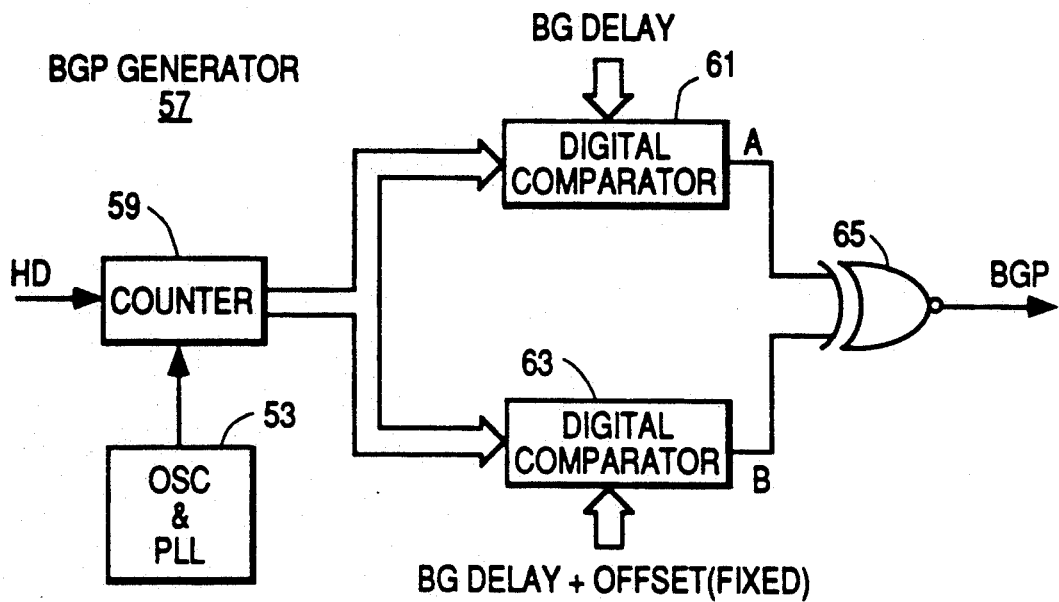
FIG. 6 is a more detailed block diagram of a portion of the PIP section shown in FIG. 2 useful in understanding an aspect of the invention.
Figure 7:
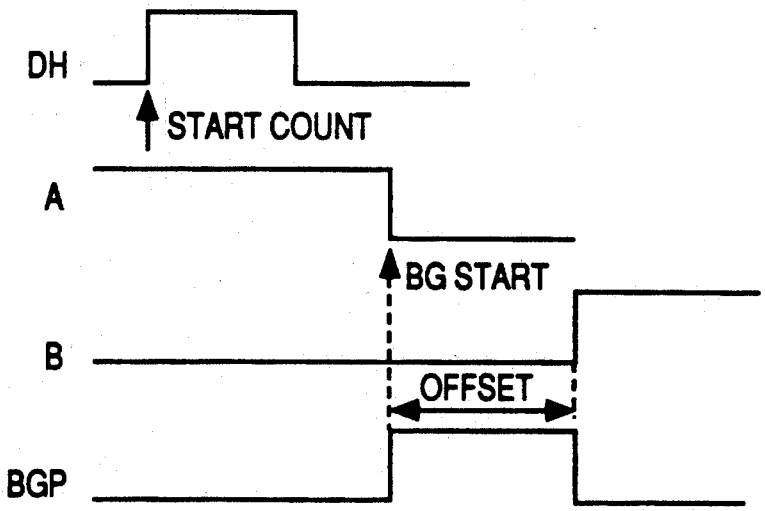
FIG. 7 is a graphical representation of waveforms helpful in understanding the operation of the portion of the PIP section shown in FIG. 6.

FIG. 6 shows an implementation of a digital burst gate pulse generator 57 and FIG. 7 shows waveforms useful in understanding its operation. A counter 59 is enabled to start counting clock signals generated by oscillator and PLL unit 53 in response to the leading edge of the deflection derived horizontal (DH) pulse. When the count reaches first value (BG DELAY) corresponding to the burst gate pulse delay value calculated during the program described above, a first digital comparator 61 generates a negative-going pulse (A). When the count reaches second value (BG DELAY+OFFSET) corresponding to the burst gate pulse delay value plus a fixed number corresponding to the desired duration of the burst gate pulse, a second digital comparator 63 generates a positive-going pulse (B). The output signals (A and B) of digital comparators 61 and 63 are combined by an exclusive nor gate 65 to produce the burst gate pulse. The BG DELAY and OFFSET values are transmitted to comparators 61 and 63 through the control bus coupled between control unit 33 and PIP IC 37.

Figure 8:
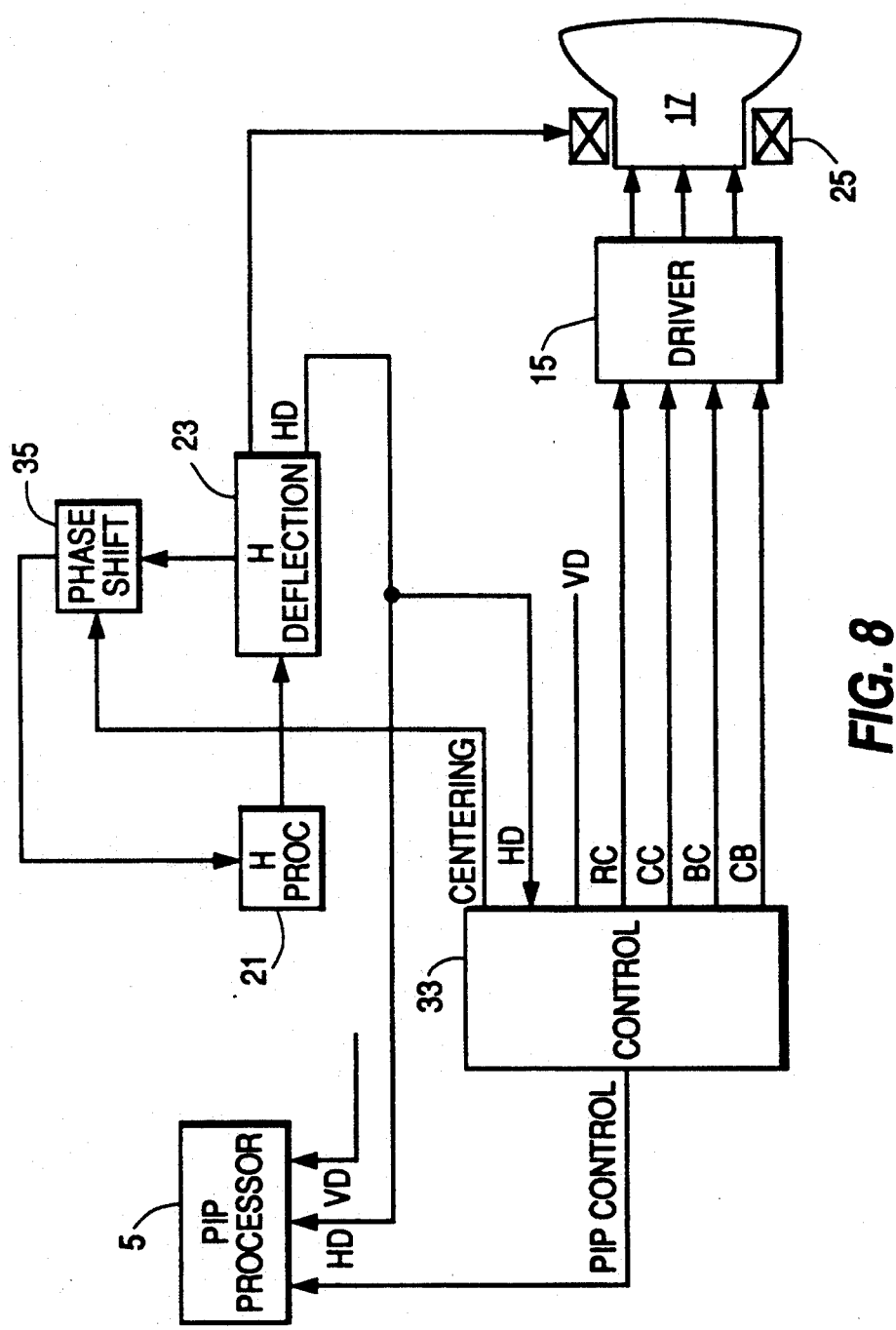
FIG. 8 is a block diagram of a portion of the television receiver modified in accordance with another aspect of the invention.

FIG. 8 shows another embodiment of the invention. In the arrangement show in FIG. 8, phase shift network 35 is controlled in response to a digital centering control signal generated by control unit 33 and coupled to it via a control bus coupled between control unit 33 and phase shift network 35. In that case, control unit 33 contains the information defining the relationship between the positions of the deflection derived horizontal (DH) sync pulses and video related horizontal (VH) sync pulses of the composite sync signal and does not have to obtain it by measurement. It utilizes that information to determine the burst gate pulse delay value coupled to PIP IC 37. A digital entering arrangement is described in U.S. patent application Ser. No. 499,226, entitled "Adjustable Video/Raster Phasing for Horizontal Deflection System", filed on Mar. 26, 1990 for T. J. Christopher and R. T. Keen, and assigned to the same assignee as that of the present application.

Although it is usually desirable to synchronized the OSD character signals and the luminance and chrominance components for the PIP insert with the deflection derived (DH) sync pulses so as to horizontally position the OSD characters and graphics and PIP insert relative to the main picture, the centering adjustment may cause the OSD characters and graphics or PIP insert to be moved too close to one of the edges of the screen. It is recognized that the invention may be utilized to position OSD characters and graphics and the PIP insert independently of the the centering adjustment, if desired. These and other modifications are intended to be within the scope of one or more of the following claims.

I claim:

1. In a television system including a picture tube and a deflection coil associated with said picture tube, apparatus comprising:

a source of a video signal including image and an image synchronization component;

means for processing said image component of said video signal and applying a processed version of said image component to said picture tube;

means for processing said synchronization component of said video signal to derive a deflection signal for said deflection coil;

means responsive to said deflection signal for generating a deflection related synchronization signal;

means for generating a delay control signal representing the time delay between said deflection related synchronization signal and said image synchronization component of said video signal;

means which does not receive said image synchronization component of said video signal for generating a timing signal delayed in time from said deflection responsive synchronization signal in accordance with said delay control signal in response to said deflection responsive synchronization signal and said delay control signal but not directly in response to said image synchronization component of said video signal; and means for utilizing said timing signal.

2. The television system defined in claim 1, wherein: said means for generating said delay control signal includes for measuring the time delay between said deflection related synchronization signal and said image synchronization component of said video signal.

3. The television system defined in claim 1, further including:

means for adjusting the phase of said deflection signal relative to said synchronization component of said video signal in response to an adjustment control signal.

4. The television system defined in claim 3, wherein: said means for generating said delay control signal is directly responsive to said adjustment control signal without measuring the time delay between said deflection related synchronization signal and said image synchronization component of said video signal.

5. In a television system including a picture tube and a deflection coil associated with said picture tube, apparatus comprising:

a source of a video signal including luminance, chrominance and image synchronization components; said chrominance component including a modulated color subcarrier and a color burst component; said image synchronization component including horizontal and vertical synchronization pulses;

means for processing said luminance and chrominance components of said video signal and applying processed versions of said luminance and chrominance component to said picture tube;

means for processing said image synchronization component of said video signal to derive horizontal and vertical deflection signals for said deflection coil;

means responsive to said horizontal deflection signal for generating a deflection related horizontal synchronization pulses;

means for generating a delay control signal representing the time delay between said deflection related horizontal synchronization pulses and said horizontal synchronization pulses of said image synchronization component of said video signal;

means which does not receive said image synchronization component of said video signal for generating color burst gate pulses delayed in time from said deflection related horizontal synchronization pulses in accordance with said delay control signal in response to said deflection responsive synchronization signal and said delay control signal but not directly in response to said image synchronization component of said video signal; and means for deriving a signal having its phase and frequency locked to the phase and frequency of said color subcarrier of said chrominance component of said video signal utilizing said color burst pulses.

6. The television system defined in claim 5, wherein: said means for deriving said signal having its phase and frequency locked to the phase and frequency of said color subcarrier of said chrominance component of said video signal is included within a picture-in-picture processing unit.

7. The television system defined in claim 1, wherein: said delay control signal comprises a digital word.

8. The television system defined in claim 1, wherein: said means for generating said delay control signal comprises a microprocessor.

9. The television system defined in claim 5, wherein: said delay control signal comprises a digital word.

10. The television system defined in claim 5, wherein: said means for generating said delay control signal comprises a microprocessor.

11. In a television system including a picture tube and a deflection coil associated with said picture tube, apparatus comprising:

a source of a video signal including image and an image synchronization components;

means for processing said image component of said video signal and applying a processed version of said image component to said picture tube;

means for processing said image synchronization component of said video signal to derive a deflection signal for said deflection coil;

means responsive to said deflection signal for generating a deflection related synchronization signal;

means for generating a digital delay control word representing the time delay between said deflection related synchronization signal and said image synchronization component of said video signal;

means for generating a timing signal delayed in time from said deflection responsive synchronization signal in accordance with said digital delay control word in response to said deflection responsive synchronization signal and said delay control signal but not directly in response to said image synchronization component of said video signal; and means for utilizing said timing signal.

12. The television system defined in claim 11, wherein:

said means for generating said digital delay control word comprises a microprocessor.

13. The television system defined in claim 11, wherein:

said means for generating said digital delay control word includes for measuring the time delay between said deflection related synchronization signal and said image synchronization component of said video signal.

14. The television system defined in claim 11, further including:

means for adjusting the phase of said deflection signal relative to said synchronization component of said video signal in response to a digital adjustment control word.

15. The television system defined in claim 14, wherein:

said means for generating said digital delay control word is directly responsive to said digital adjustment control word without measuring the time delay between said deflection related synchronization signal and said image synchronization component of said video signal.

16. The television system defined in claim 11, wherein:

said image component of said video signal includes luminance and chrominance components; said chrominance component including a modulated color subcarrier and a color burst component in a timed relationship with said image synchronization component;

said timing signal comprises a color burst gate pulse signal which occurs in-phase with said color burst component; and further including means for deriving a signal having its phase and frequency locked to the phase and frequency of said color subcarrier of said chrominance component of said video signal utilizing said color burst pulse signal;

said means for generating said timing signal and said means for deriving said signal having its phase and frequency locked to the phase and frequency of said color subcarrier of said chrominance component of said video signal being included within a picture-in-picture processing unit which does not receive said image synchronization components of said video signal.

* * * * *